(12) United States Patent
Kitano et al.

(10) Patent No.: US 9,243,599 B2
(45) Date of Patent: Jan. 26, 2016

(54) ENGINE STARTING DEVICE

(75) Inventors: Hiroaki Kitano, Tokyo (JP); Masahiko Kurishige, Tokyo (JP); Koichiro Kamei, Tokyo (JP); Kazuhiro Odahara, Tokyo (JP); Naohito Kaneda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 742 days.

(21) Appl. No.: 13/499,827

(22) PCT Filed: Oct. 22, 2010

(86) PCT No.: PCT/JP2010/006276
§ 371 (c)(1),
(2), (4) Date: Apr. 2, 2012

(87) PCT Pub. No.: WO2011/052174
PCT Pub. Date: May 5, 2011

(65) Prior Publication Data
US 2012/0199090 A1 Aug. 9, 2012

(30) Foreign Application Priority Data

Oct. 27, 2009 (JP) ................................. 2009-246460

(51) Int. Cl.
*F02N 11/00* (2006.01)
*F02N 11/08* (2006.01)
*F02N 15/06* (2006.01)

(52) U.S. Cl.
CPC ........ *F02N 11/0814* (2013.01); *F02N 11/0844* (2013.01); *F02N 11/0855* (2013.01);
(Continued)

(58) Field of Classification Search
CPC ............ F02N 11/0855; F02N 11/0814; F02N 11/0851; F02N 11/0803; F02N 11/0844; F02N 15/067; F02N 2200/022; Y02T 10/48

USPC ............. 123/179.4, 179.25, 179.3; 290/38 R; 701/113, 110, 112
See application file for complete search history.

(56) References Cited

U.S. PATENT DOCUMENTS 7,275,509 B2  10/2007  Kassner
2005/0221952 A1*  10/2005  Tetsuno et al. ................ 477/115
(Continued)

FOREIGN PATENT DOCUMENTS

JP  2002-070699 A   3/2002
JP  2005 330813     12/2005
(Continued)

OTHER PUBLICATIONS

Office Action issued on Mar. 4, 2014 in the corresponding Japanese Patent Application No. 2013-140966 (with English Translation).
(Continued)

*Primary Examiner* — Hai Huynh
*Assistant Examiner* — Gonzalo Laguarda
(74) *Attorney, Agent, or Firm* — Oblon, McClelland, Maier & Neustadt, L.L.P.

(57) ABSTRACT

Provided is an engine starting device enabling the meshing engagement of a pinion gear and a ring gear to be quickly and quietly achieved in an automatic idle-stop system while an engine is rotating by inertia. The engine starting device includes: a ring gear connected to a crankshaft of an engine; a starter motor for starting the engine; a pinion gear for transmitting rotation of the starter motor to the ring gear; pinion-gear moving portion for moving the pinion gear so as to achieve meshing engagement with the ring gear; and starter control portion for executing any one of a plurality of control modes.

12 Claims, 9 Drawing Sheets

(52) U.S. Cl.
CPC ........... *F02N15/067* (2013.01); *F02N 11/0818* (2013.01); *F02N 2200/022* (2013.01); *F02N 2300/2002* (2013.01); *Y02T 10/48* (2013.01)

(56) References Cited

U.S. PATENT DOCUMENTS

| | | | |
|---|---|---|---|
| 2008/0115753 | A1 | 5/2008 | Noguchi |
| 2009/0224557 | A1* | 9/2009 | Reynolds et al. ............ 290/38 R |
| 2010/0050970 | A1* | 3/2010 | Okumoto et al. ........... 123/179.4 |
| 2010/0059007 | A1* | 3/2010 | Senda et al. ............... 123/179.4 |
| 2010/0180849 | A1* | 7/2010 | Senda et al. ............... 123/179.4 |
| 2010/0256896 | A1 | 10/2010 | Kitano et al. |
| 2012/0103294 | A1 | 5/2012 | Kitano et al. |

FOREIGN PATENT DOCUMENTS

| | | |
|---|---|---|
| JP | 2007 107527 | 4/2007 |
| JP | 4 171504 | 8/2008 |
| JP | 4 188992 | 9/2008 |
| JP | 4188992 B2 | 9/2008 |
| JP | 2010-031851 A | 2/2010 |
| JP | 2012-505998 A | 3/2012 |

OTHER PUBLICATIONS

Japanese Office Action Issued Nov. 27, 2012 in Patent Application No. 2009-246460 (with English translation of parts).

International Search Report issued on Jan. 11, 2011 in PCT/JP10/06276 filed on Oct. 22, 2010.

U.S. Appl. No. 13/516,249, filed Jun. 15, 2012, Kitano, et al.

* cited by examiner

FIG. 7
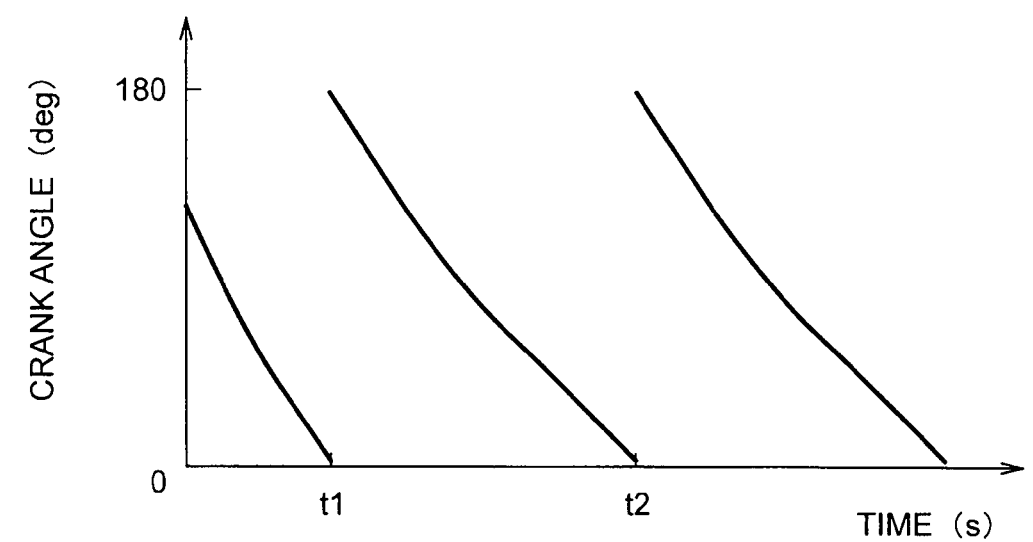
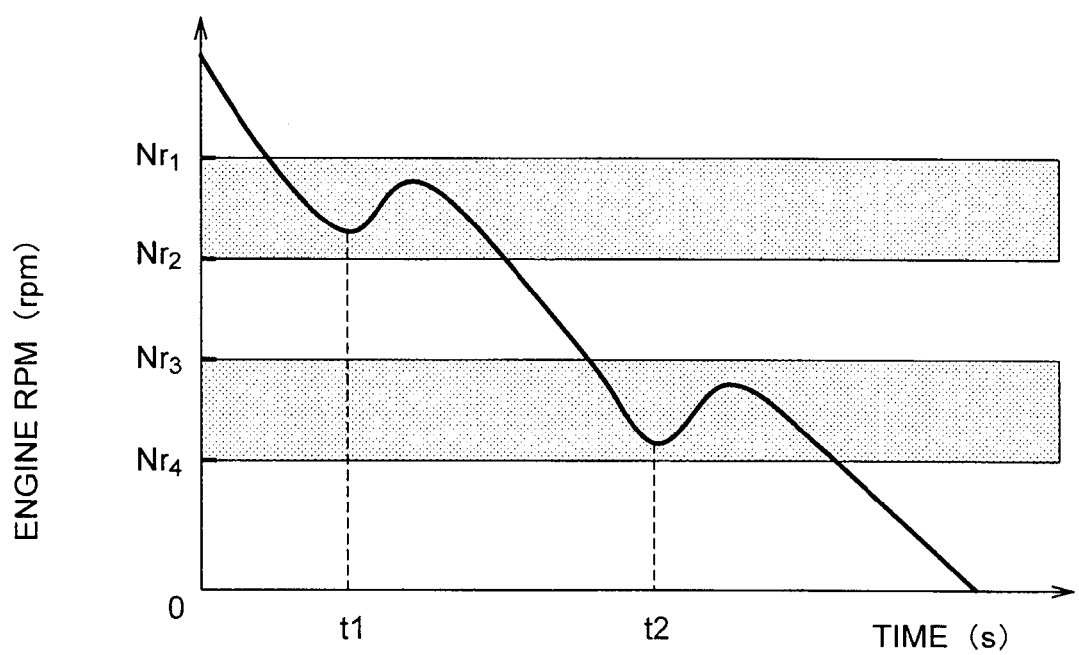

FIG. 9
(a)
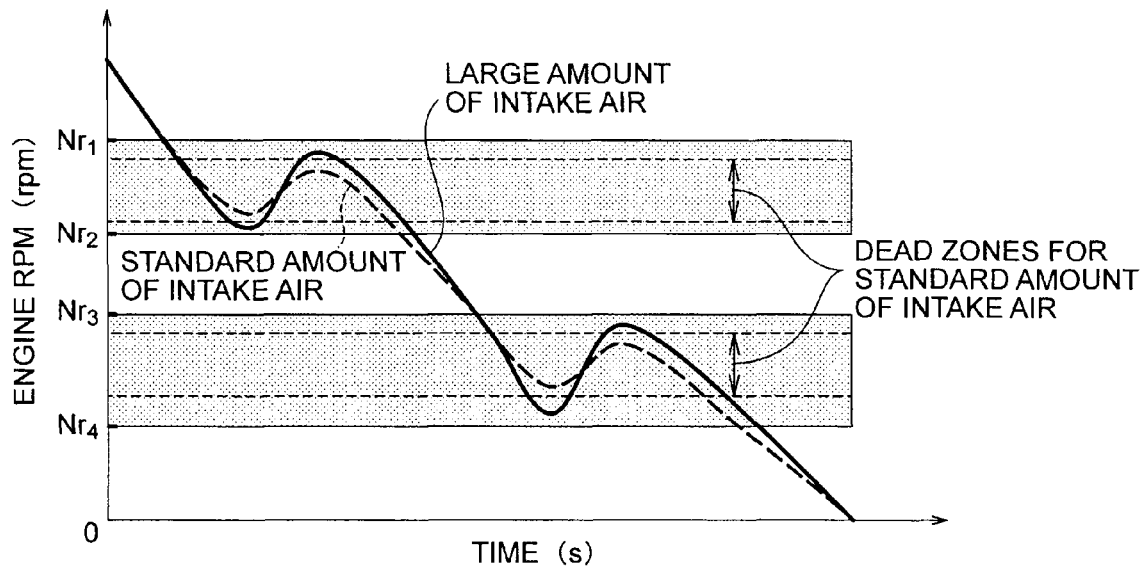
(b)
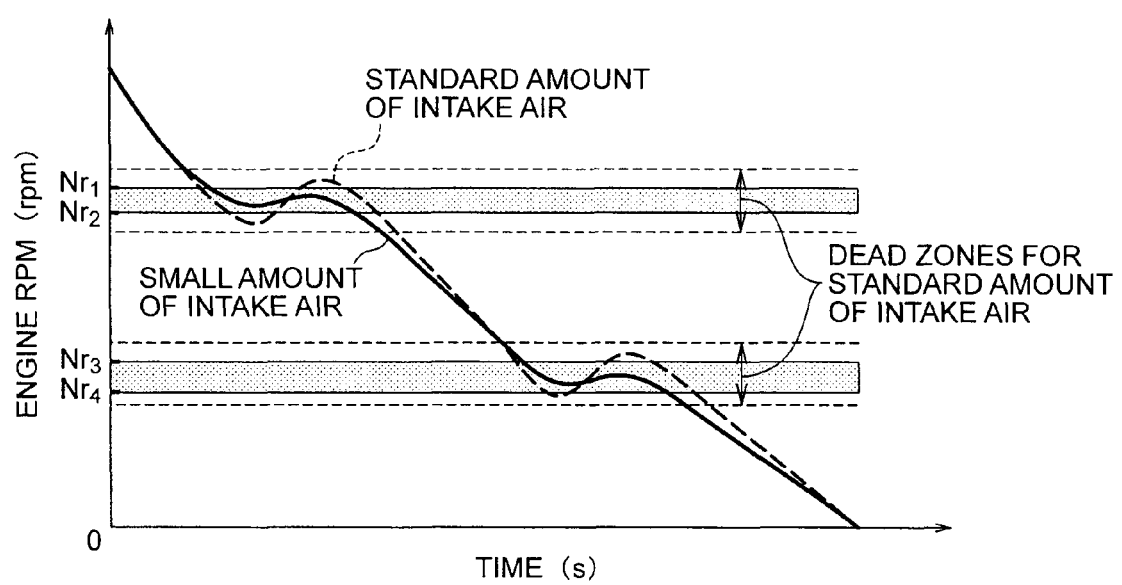

ENGINE STARTING DEVICE

TECHNICAL FIELD

The present invention relates to an engine starting device for an automatic idle-stop system which performs idle-stop of an engine when a predetermined idle-stop condition is satisfied and restarts the engine when a restart condition is thereafter satisfied.

BACKGROUND ART

Conventionally, for the purposes of improving fuel efficiency of an automobile, reducing an environmental load, and the like, an automatic idle-stop system, which automatically performs idle-stop when a predetermined condition is satisfied, has been developed. For example, with regard to a method for bringing a starter pinion into meshing engagement with a ring gear and a starter controller, there exists an engine starting device, in which, when an rpm of the ring gear is within a predetermined range and a direction of rotation is forward, the pinion gear is brought into meshing engagement with the ring gear, thereby realizing meshing state between the pinion gear and the ring gear in an early stage (see Patent Literature 1).

There also exists an engine starting device for predicting an engine rpm NE after elapse of predetermined time T(s) and determining a super-low rotation state to perform a normal restart when NE is smaller than a controllable minimum rpm Nemin of a pinion gear (see Patent Literature 2).

CITATION LIST

Patent Literature

[PTL 1]: JP 2007-107527 A
[PTL 2]: JP 2005-330813 A

SUMMARY OF INVENTION

Technical Problem

In Patent Literature 1 described above, a plunger coil is energized to push out the pinion gear. However, a change in engine rpm, occurring from the start of push-out to the abutment of the pinion gear against the ring gear, is not predicted. Therefore, there is a fear in that the engine rpm increases after the pinion gear is pushed out and a difference between the engine rpm and an rpm of the pinion gear is consequently increased to generate noise.

In the device of Patent Literature 2 described above, the engine rpm NE at the time when the pinion gear and the ring gear abut against each other is predicted so as to rotate the pinion gear and the ring gear in synchronization. For the precise prediction, however, a large computation load is imposed on an engine ECU (here, "ECU" is an abbreviation of Electronic Control Unit; hereinafter, the same abbreviation shall be used). In addition, a starter motor is energized even when the engine rpm increases to enable the restart only by restarting fuel supply without necessarily energizing a starter to bring a pinion gear rpm in synchronization. Therefore, there is a problem in that unnecessary energy is consumed, resulting in acceleration of the degradation of a starter.

The present invention has been made to solve the problems described above, and therefore has an object to provide an engine starting device enabling the meshing engagement of a pinion gear and a ring gear to be quickly and quietly achieved in an automatic idle-stop system while an engine is rotating by inertia without imposing a large computation load on an engine ECU or unnecessarily rotating a starter.

Solution to Problems

According to the present invention, there is provide an engine starting device for an automatic idle-stop system for performing an idle stop when an idle-stop condition is satisfied and restarting an engine when a restart condition is thereafter satisfied, the engine starting device including: a ring gear connected to a crankshaft of the engine; engine-rpm detection means for detecting an rpm of the engine; a starter motor for starting the engine; a pinion gear for transmitting rotation of the starter motor to the ring gear; pinion-gear moving means for moving the pinion gear so as to achieve meshing engagement with the ring gear; and starter control means for executing any one of a plurality of control modes when the restart condition is satisfied, in which the starter control means sets a dead zone in which the control modes are not executed for a time period in which a predetermined condition is satisfied.

Advantageous Effects of Invention

In the present invention, the pinion gear and the ring gear can be bought into meshing engagement quickly and quietly, which does not give a driver discomfort feeling. Further, the reduction of noise at the time of achievement of the meshing engagement of the pinion gear and the ring gear and the increase of a lifetime of components can be achieved.

BRIEF DESCRIPTION OF DRAWINGS

FIG. 7 Image diagrams illustrating an engine rpm and the crank angle when the rpm decreases during the rotation of the engine by inertia after an idle stop is started in the first embodiment of the present invention.

FIG. 9 Graphs showing a difference in engine-rpm decreasing characteristics and the setting of dead zones depending on the amount of intake air while the engine is rotating by inertia as a result of the idle stop.

Figure 1:
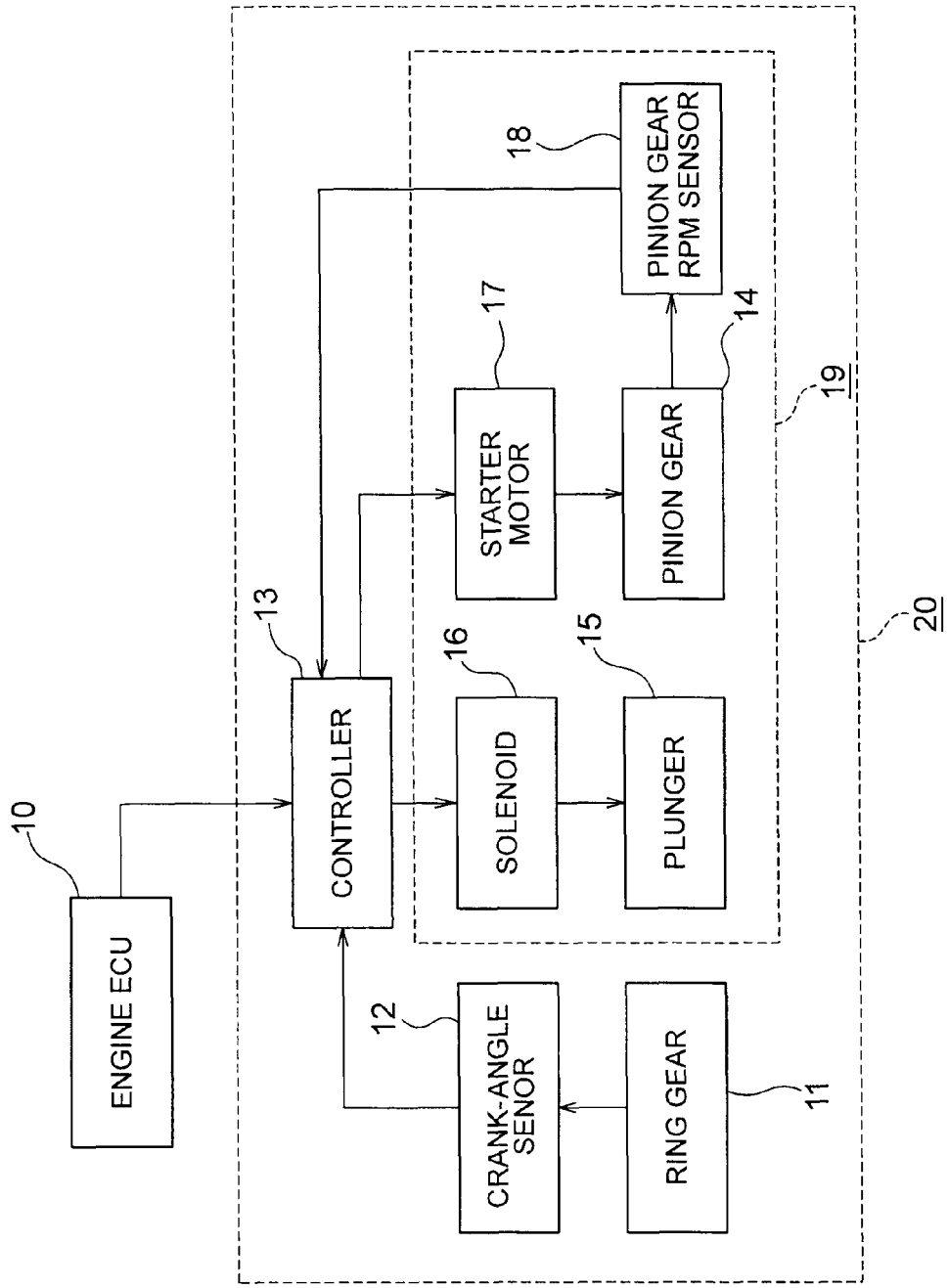
FIG. 1 A block diagram illustrating a schematic configuration of an engine starting device according to a first embodiment of the present invention.

REFERENCE SIGNS LIST 10 engine ECU, 11 ring gear, 12 crank-angle sensor, 13, 24 controller, 14 pinion gear, 15 plunger, 16 solenoid, 17 starter motor, pinion-gear rpm sensor, 19 starter, 20, 25 engine starting device, 21 engine-rpm detection means, 22 pinion-gear moving means, 23 airflow sensor

DESCRIPTION OF EMBODIMENTS

In the present invention, for restart of an engine, for which a control mode to be executed is determined from a plurality of control modes (a) to (c) described below through use of an engine rpm as a threshold value when a restart condition is satisfied while the engine is rotating by inertia as a result of an idle stop, dead zones, in which the control mode is not executed when the engine rpm is within a predetermined range, are provided:

(a) a control mode for restarting the engine only by restarting fuel supply without cranking with a starter;

(b) a control mode for rotating a starter motor to bring a pinion-gear rpm and an engine rpm into synchronization to achieve meshing engagement so as to restart the engine by cranking; and (c) a control mode for moving the pinion gear without rotating the starter motor to achieve the meshing engagement and then restarting the engine by cranking.

In this manner, for example, the restart of the engine is prevented from being disabled in the executed control mode because of an increase in engine rpm after the control mode is switched due to a fluctuation in torque caused by compression and expansion of a piston, which are caused for each crank angle, and a difference in rpm between the engine and the pinion gear is prevented from being out of the range in which the meshing engagement can be achieved. As a result, the pinion gear and the ring gear can be smoothly brought into meshing engagement with each other.

Hereinafter, an engine starting device according to the present invention is described by means of embodiments with reference to the drawings. In the drawings, the same or equivalent parts are denoted by the same reference numerals, and the overlapping description is herein omitted.

First Embodiment

FIG. 1 is a block diagram illustrating a schematic configuration of an engine starting device according to a first embodiment of the present invention. In FIG. 1, an engine ECU 10 determines whether or not idle-stop conditions (for example, a speed is equal to or lower than 5 km/h, a driver depresses a brake pedal, and the like) are satisfied, and inputs the results of determination to a controller 13 of an engine starting device 20. The engine starting device 20 includes a ring gear 11 connected to a crankshaft (not shown) of an engine, a crank-angle sensor 12 for detecting a crank angle of the engine, a starter 19, and a controller 13 for controlling energization of a starter motor 17 and a solenoid 16. The starter 19 includes a pinion gear 14 for transmitting the rotation of the starter motor 17, a plunger 15 for moving the pinion gear 14 to bring the pinion gear into meshing engagement with the ring gear 11, the solenoid 16 capable of moving the plunger 15 by energization, and a pinion-gear rpm sensor 18 capable of detecting an rpm of the pinion gear 14. The controller 13 can control the energization of the starter motor 17 and the energization of the solenoid 16 independently.

An engine rpm Nr is computed by the controller 13 from a sensor input cycle output from the crank-angle sensor 12. Instead, however, a rotation encoder, a pulse generator capable of detecting a pulse of a tooth of the ring gear, or the like may be provided so as to detect the engine rpm Nr by using another means using, for example, frequency-voltage (FV) conversion of signals from the rotation encoder and the pulse generator.

Although a pinion-gear rpm Nst is detected by the pinion-gear rpm sensor using a Hall element or the like, the pinion-gear rpm Nst may be detected by using other means than the pinion-gear rpm sensor, such as an rpm table corresponding to a voltage or current applied to the starter motor 17.

Moreover, although the controller 13 and the engine ECU 10 are illustrated in FIG. 1 as being independent of each other, the engine ECU 10 may perform processing instead of providing the controller 13. Therefore, the engine starting device 20 may include the engine ECU 10.

Starter control means includes both or any one of the controller 13 and the engine ECU 10 described above.

Figure 2:
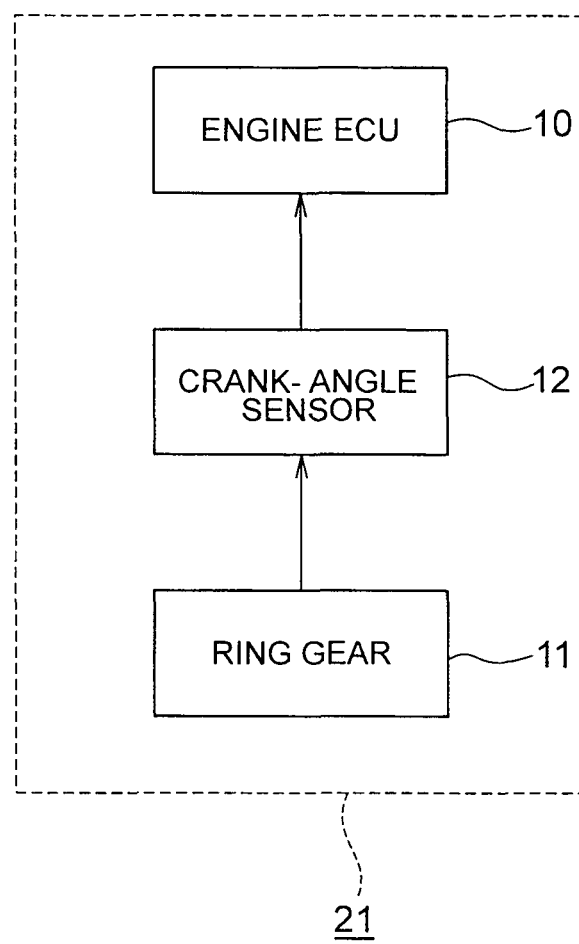
FIG. 2 A block diagram illustrating a schematic configuration of engine-rpm detection means in the first embodiment of the present invention.
Figure 3:
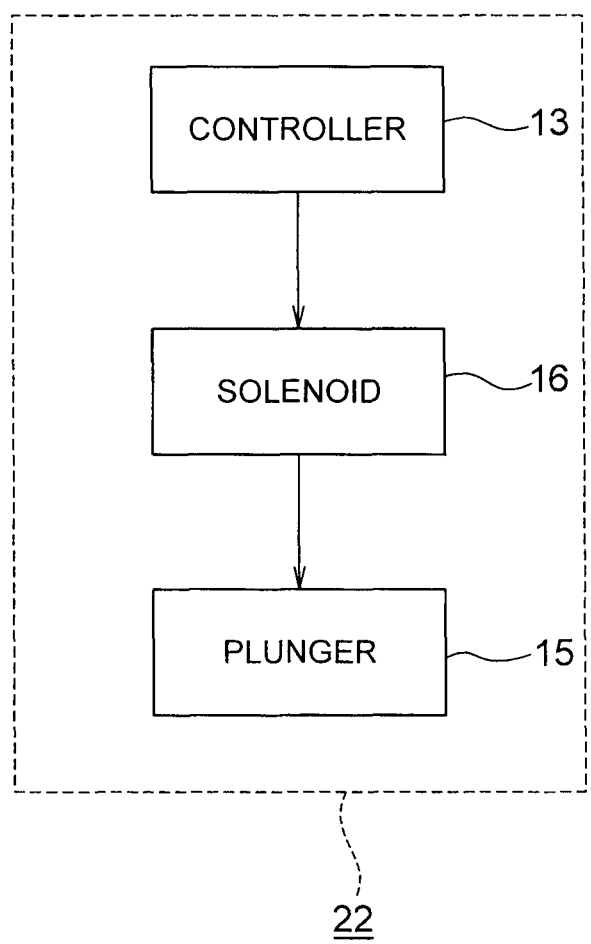
FIG. 3 A block diagram illustrating a schematic configuration of pinion-gear moving means in the first embodiment of the present invention.

Both or any one of the controller 13 and the engine ECU 10, the crank-angle sensor 12, and the ring gear 11 constitute engine-rpm detection means 21 (see FIG. 2), whereas both or any one of the controller 13 and the engine ECU 10, the plunger 15, and the solenoid 16 constitute pinion-gear moving means 22 (see FIG. 3).

In general, the pinion gear 14 has a smaller number of teeth than the ring gear 11. For avoiding confusion, the pinion gear rpm and the engine rpm used in this embodiment are those converted into the ring-gear rpm in view of a ratio of the number of teeth of the pinion gear and that of the ring gear.

Figure 4:
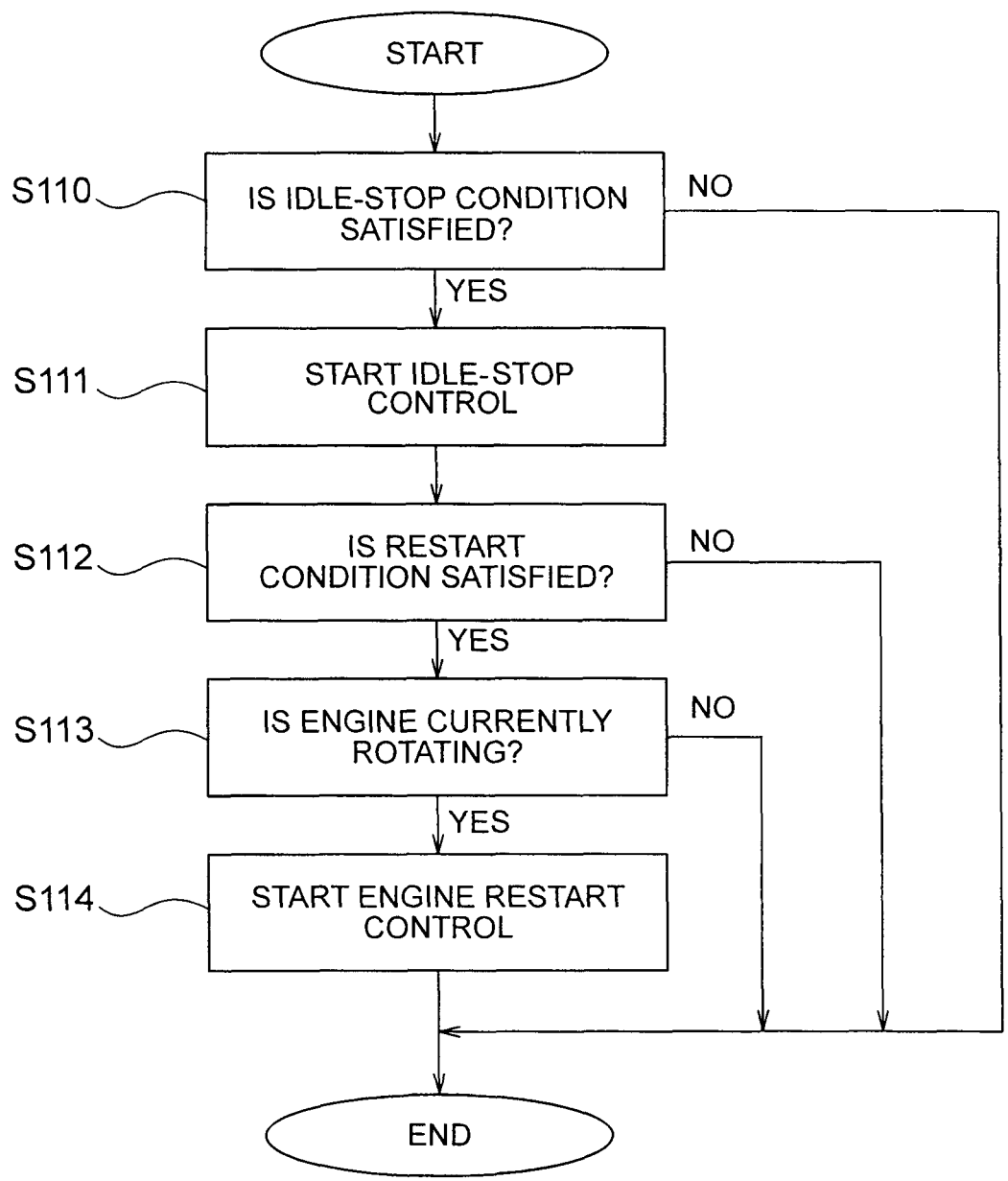
FIG. 4 A flowchart illustrating a flow of idle-stop control in the first embodiment of the present invention.
Figure 5:
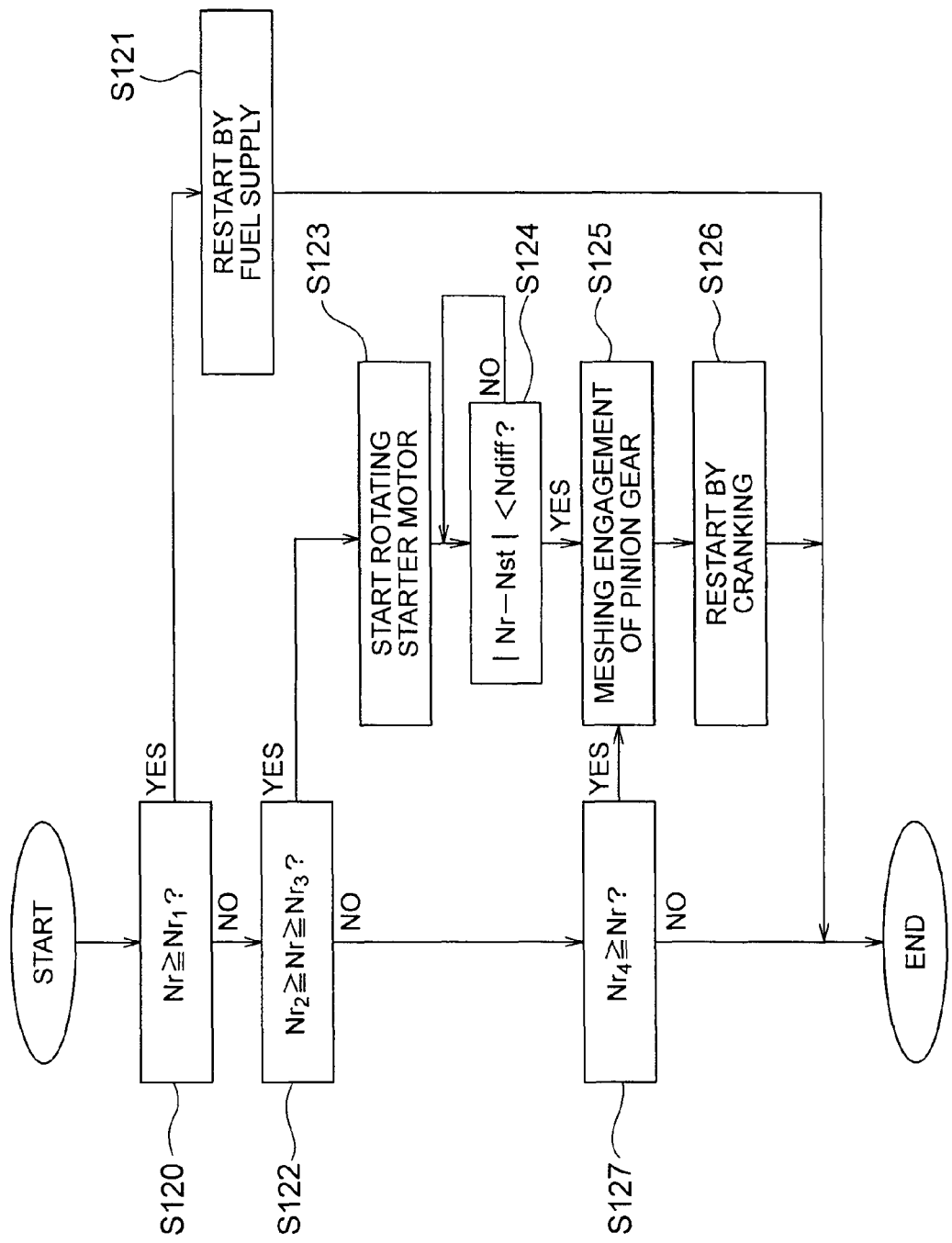
FIG. 5 A flowchart illustrating a flow of engine restart control in the first embodiment of the present invention.

Next, an operation of the first embodiment is described. FIGS. 4 and 5 are flowcharts, each illustrating processing performed in the controller 13 and the engine ECU 10 in the first embodiment.

First, in the engine ECU 10, it is determined whether or not an idle-stop condition is satisfied (S110). When the idle-stop condition is not satisfied, the processing proceeds to a next control cycle. When the idle-stop condition is satisfied in Step S110, idle-stop control is started (S111) so as to stop the fuel supply to the engine by the control of the engine ECU 10. Then, while the engine rpm is decreasing during the rotation of the engine by inertia, it is determined whether or not an engine restart condition (for example, release of a driver's foot from a brake pedal or the like) is satisfied based on a signal input to the engine ECU 10 (S112). When the restart condition is satisfied, the processing proceeds to Step S113. When the restart condition is not satisfied, the processing proceeds to the next control cycle. In Step S113, whether or not the engine is currently rotating is determined. When it is determined that the engine is currently rotating, the processing proceeds to Step S114 where the engine restart control is started. When it is determined that the engine is not rotating, specifically, the engine is in a completely stopped state, the processing proceeds to the next control cycle. For the determination of whether or not the engine is currently rotating, for example, when there is no input to the crank-angle sensor 12 for a predetermined period of time, it is determined that the engine is in the completely stopped state.

Next, the engine restart control is described with reference to FIG. 5.

First, in Step S120, it is determined whether or not the engine rpm Nr is equal to or larger than an rpm $Nr_1$ allowing self-recovery of the engine (for example, 700 rpm).

The self-recoverability of the engine means that the restart can be performed only by injecting and igniting a fuel without cranking with the starter 19. An example of this control is to inject a larger amount of the fuel to facilitate the combustion. However, the details of the control for the self-recovery of the engine are not encompassed within the present invention and therefore are not specifically described herein.

When it is determined in Step S120 that the engine rpm Nr is equal to or larger than the rpm $Nr_1$ allowing the self-recovery of the engine, the processing proceeds to Step S121 where engine self-recovery control is performed to restart the engine. On the other hand, when the engine rpm is smaller than the rpm $Nr_1$ allowing the self-recovery of the engine in Step S120, the processing proceeds to Step S122.

In Step S122, it is determined whether or not the engine rpm Nr is equal to or smaller than $Nr_2$ which is smaller than the rpm $Nr_1$ allowing the self-recovery of the engine by a predetermined rpm (for example, 50 rpm) and is equal to or larger than $Nr_3$ (for example, 250 rpm) which is larger than $Nr_4$ described below and is determined in view of the effects of a fluctuation in rpm by expansion and compression torques of a cylinder of the engine. When the engine rpm Nr is equal to or smaller than the above-mentioned $Nr_2$ and is equal to or larger than the above-mentioned $Nr_3$, the processing proceeds to Step S123 where the rotation of the pinion gear 14 is started by energization of the starter motor 17.

In Step S124, an rpm difference between the engine rpm Nr and the pinion-gear rpm Nst and a predetermined rpm difference Ndiff allowing meshing engagement are compared with each other. When the rpm difference is smaller than Ndiff, the processing proceeds to Step S125 where the plunger 15 is made movable by the energization of the solenoid 16 to move the pinion gear 14 so as to achieve the meshing engagement of the pinion gear and the ring gear.

Then, in Step S126, the engine is restarted by cranking. When the rpm difference between the engine rpm Nr and the pinion-gear rpm Nst is equal to or larger than Ndiff in Step S124, Step S124 is repeated until the rpm difference becomes smaller than Ndiff.

Next, the effects of the first embodiment are described.

First, the reason for setting $Nr_2$ used in Step S122 smaller than the rpm $Nr_1$ allowing the self-recovery of the engine and providing the dead zone is described. Here, the dead zone is set to be the range of the engine rpm from $Nr_1$ to $Nr_2$.

Figure 6:
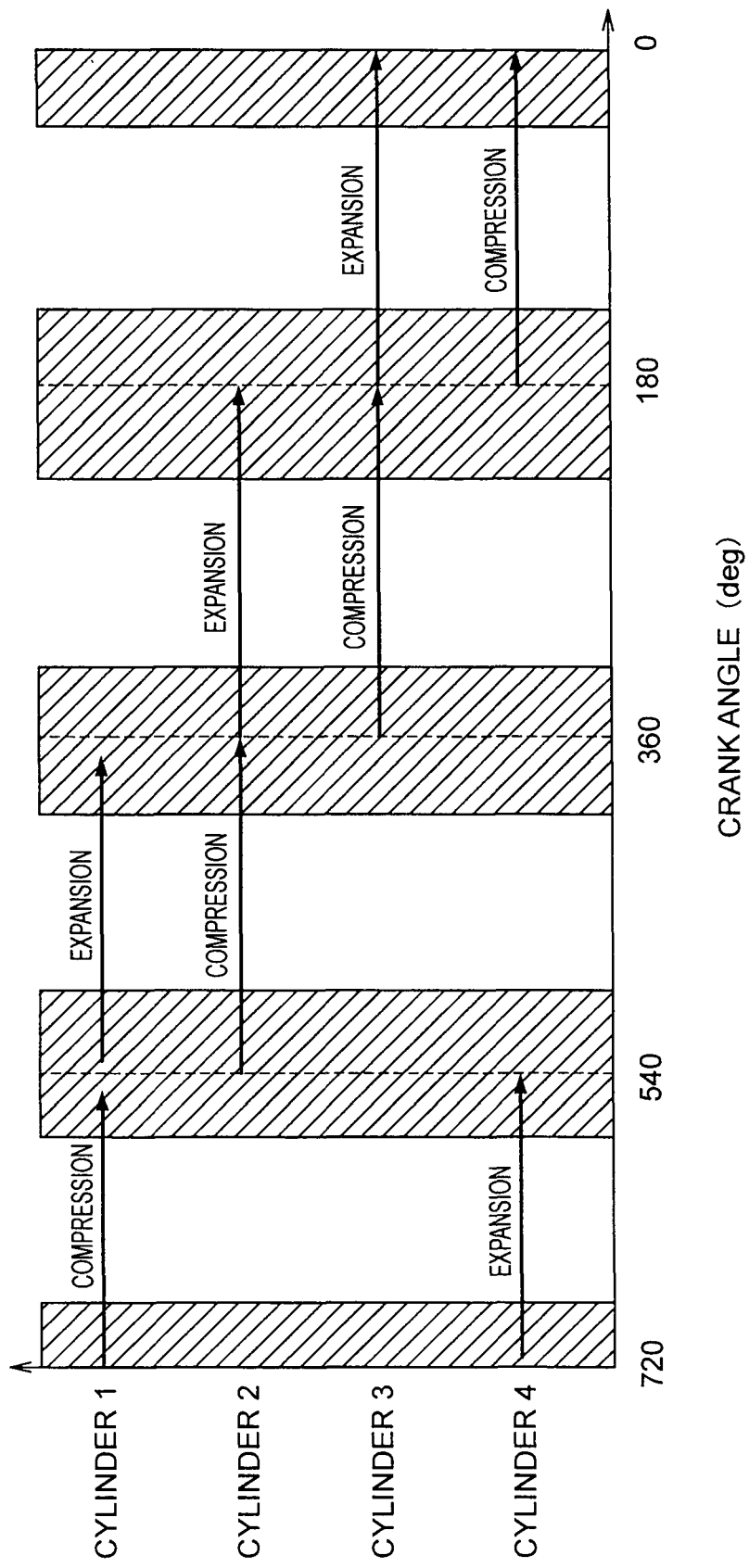
FIG. 6 An image diagram illustrating a crank angle and intake and exhaust strokes of each cylinder of a four-cylinder engine in the first embodiment of the present invention.

FIG. 6 illustrates, as an example, strokes of each cylinder during one cycle in the four-cylinder engine. One cycle (four strokes, that is, compression, expansion, exhaustion, and intake strokes) is performed for each cylinder during two revolutions (720 degrees). As indicated in hatched areas, any one of the cylinders is in a second half of the compression stroke, and another one of the cylinders in a second half of the expansion stroke immediately before TDC. During the compression stroke, a torque which prevents the forward rotation of the engine becomes larger due to compression in the second half of the compression stroke. During the expansion stroke, a torque which facilitates the forward rotation of the engine becomes smaller due to the expansion in the second half of the expansion stroke. Therefore, immediately before TDC, a reduction in engine rpm becomes larger as compared with that in the other crank-angle region.

On the other hand, immediately after TDC, any one of the cylinders is in a first half of the compression stroke, and another one of the cylinders is in a first half of the expansion stroke. In the first half of the compression stroke, the torque which prevents the forward rotation of the engine becomes small. In the first half of the expansion stroke, the torque which facilitates the forward rotation of the engine becomes large.

Thus, immediately after TDC, the reduction in engine rpm becomes smaller as compared with that in the other crank-angle region. In some cases, the rpm increases. For the reason described above, a pulsation in engine rpm occurs at the crank angle in the vicinity of TDC (see FIG. 7).

Therefore, as shown in FIG. 7, for example, when the restart condition is satisfied immediately after the engine rpm Nr becomes smaller than the rpm $Nr_1$ allowing the self-recovery of the engine, there is a possibility that the engine rpm Nr increases to exceed the rpm $Nr_1$ allowing the self-recovery of the engine again due to the fluctuation in torque.

Thus, the dead zones are provided in the hatched areas illustrated in FIG. 7 up to the rpm $Nr_2$ which does not exceed the rpm $Nr_1$ allowing the self-recovery of the engine even if the engine rpm Nr is increased due to the fluctuation in torque, thereby preventing switching to a next control mode. In this manner, the number of chances of the restart by the self-recovery of the engine is increased as much as possible to reduce the number of times of bringing the pinion gear 14 into meshing engagement by rotating the starter motor 17. Thus, there are advantages in an increased lifetime of the starter 19, quietness provided by eliminating the cranking, and quicker restart by restart performed only by the fuel resupply.

Next, when it is determined in Step S122 that the engine rpm Nr is smaller than $Nr_3$, the processing proceeds to Step S127 where it is determined whether the engine rpm Nr is equal to or smaller than the engine rpm $Nr_4$ (for example, 50 rpm) which allows the meshing engagement without rotating the pinion gear 14.

When the engine rpm Nr is equal to or smaller than $Nr_4$, the processing proceeds to Step S125 where the pinion gear and the ring gear are brought into meshing engagement with each other in the same procedure as that described above to restart the engine by cranking. When it is determined in Step S127 that the engine rpm Nr is larger than $Nr_4$, the processing proceeds to the next control cycle.

Here, the reason for setting $Nr_4$ used in Step S127 smaller than the rpm $Nr_3$ allowing the self-recovery of the engine and providing the dead zone is described.

As described above, the engine rpm Nr is decreasing while generating the pulsation due to the expansion and compression torques by the movement of the pistons. In the case where the pinion gear 14 is immediately moved so as to achieve the meshing engagement in response to a restart request when the engine rpm is smaller than $Nr_3$ described above and larger than $Nr_4$ described above, the engine rpm Nr increases due to the aforementioned fluctuation in torque. Therefore, long time is required for the engine rpm to become equal to the rpm $Nr_4$ allowing the meshing engagement. As a result, there is a possibility that the gears are worn and noise is generated.

Therefore, the control mode is prevented from being switched to the next control mode by providing the dead zone in the hatched area illustrated in FIG. 7 up to the rpm $Nr_4$ which does not exceed $Nr_3$ even if the engine rpm Nr is increased due to the fluctuation in torque. In this manner, the difference in rpm between the ring gear and the pinion gear at the time when the pinion gear 14 is brought into meshing engagement is reduced, providing advantages in reduction of wear of the ring gear and the pinion gear, reduction of noise at the time of meshing engagement, and the like.

As described above, the rpms $Nr_1$, $Nr_2$, $Nr_3$, and $Nr_4$ for determining the ranges of engine rpm are set to different values. In the ranges of engine rpm, the control mode for allowing the self-recovery of the engine by the fuel resupply, the control mode for rotating the starter motor 17 so as to synchronize the rpm of the ring gear and the rpm of the pinion gear to bring the gears into meshing engagement with each other to restart the engine, and the control mode for rotating the starter motor 17 to restart the engine after the start of movement of the pinion gear are respectively executed. By providing the dead zones between the control modes, the wear of the gears and the generation of noise due to a large difference in rpm at the time of abutment of the gears against each other, which is caused by the pulsation in the engine rpm, are prevented.

As described above, the engine starting device 20 according to the first embodiment of the present invention includes the ring gear 11 connected to the crankshaft of the engine, the crank-angle sensor 12 for detecting the crank angle of the engine, the starter 19, and the controller 13 for controlling the energization of the starter motor 17 and the solenoid 16. The starter 19 includes the pinion gear 14 for transmitting the rotation of the starter motor 17, the plunger 15 for moving the pinion gear 14 to achieve the meshing engagement with the ring gear 11, the solenoid 16 capable of moving the plunger 15 by energization, and the pinion-gear rpm sensor 18 capable of detecting the rpm of the pinion gear 14. The control of the energization by the controller 13 allows the control of the energization of the starter motor 17 and the energization of the solenoid 16.

The controller 13 and the engine ECU 10 change the control mode depending on the engine rpm Nr obtained when the restart condition is satisfied and then the engine is restarted in accordance with the flowcharts of FIGS. 4 and 5.

As described above, according to this embodiment, the satisfaction of the idle-stop condition is input to the controller 13 by the engine ECU 10. The dead zones are provided between the ranges of engine rpm, in which the respective control modes are executed, so as to prevent the control mode from being switched due to an increase in engine rpm caused by the torque pulsation while the rpm is decreasing during the rotation of the engine by inertia. As a result, noise generated at the time when the ring gear 11 and the pinion gear 14 are brought into meshing engagement is reduced so as to further reduce a shock. In this manner, even a lifetime of the components can be prolonged.

In this embodiment, $Nr_1$, $Nr_2$, $Nr_3$, and $Nr_4$ are described as constants. However, because generation of the torque pulsation is substantially determined by predetermined crank angles, $Nr_1$, $Nr_2$, $Nr_3$, and $Nr_4$ may be set variable depending on a crank angle $C_{ang}$ in the control cycle as long as the magnitude relation ($Nr_1 > Nr_2 > Nr_3 > Nr_4$) illustrated in FIG. 7 is not changed. For example, when any one of the cylinders of the engine is at the crank angle (in the hatched area of FIG. 6) corresponding to the vicinity of TDC, if the cylinder is in the compression stroke immediately before TDC, the engine rpm ($Nr_1$ or $Nr_3$) for determining an upper limit of the dead zone may be set high. On the other hand, if the cylinder is in the expansion stroke immediately after TDC, the engine rpm ($Nr_2$ or $Nr_4$) for determining a lower limit of the dead zone may be set low.

As a result, the range of the dead zone is enlarged only for a time period in which the engine rpm Nr changes due to the torque pulsation, whereas the range of the dead zone is narrowed for the other time period. In this manner, the time period in which the engine restart control is not executed is shortened to realize the engine restart earlier.

Moreover, in this embodiment, the description is given with the three control modes and the two dead zones. However, the dead zones are not necessarily required to be provided between all the control modes. For example, only the dead zone determined by $Nr_3$ and $Nr_4$ may be provided without providing the dead zone determined by $N_1$ and $Nr_2$.

In this embodiment, the control mode is determined depending on the engine rpm. However, the same effects are obtained even by using a value relating to an operating state of the engine, such as the crank angle and time from the start of the idle stop.

Second Embodiment

Figure 8:
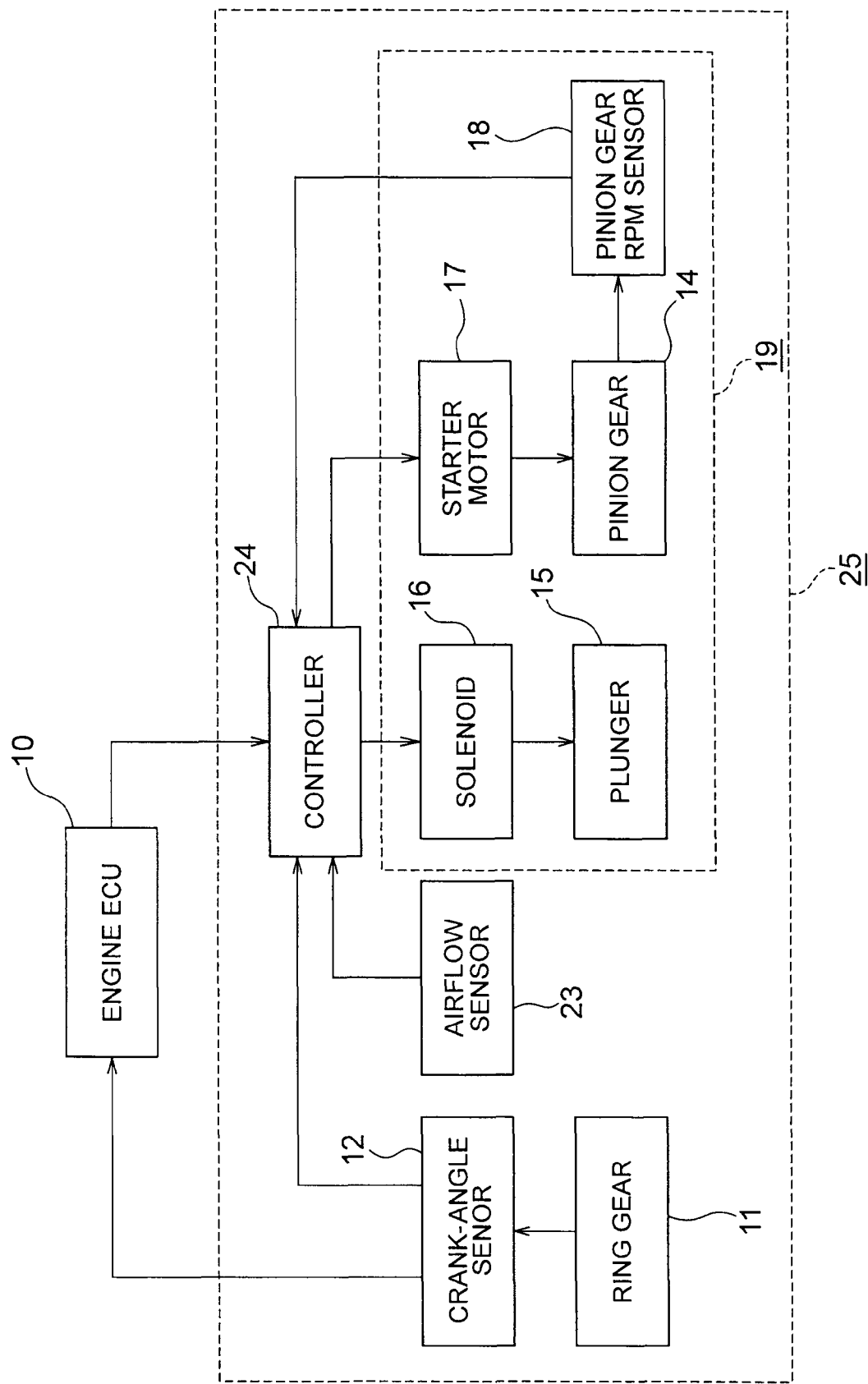
FIG. 8 A block diagram illustrating a schematic configuration of an engine starting device according to a second embodiment of the present invention.

FIG. 8 is a block diagram illustrating a schematic configuration of an engine starting device according to a second embodiment of the present invention. The engine starting device illustrated in FIG. 8 includes an airflow sensor (intake-air amount detection means) 23 for detecting the amount of intake air sucked into the engine. The engine rpms $Nr_1$, $Nr_2$, $Nr_3$, and $Nr_4$, based on which the dead zones in the first embodiment are determined, may be set based on the amount of intake air. In FIG. 8, the controller is denoted as a controller 24.

FIG. 9 show engine-rpm decreasing characteristics in accordance with a difference in the amount of intake air while the engine is rotating by inertia as a result of idle stop. As shown in FIG. 9, the expansion and compression torques change depending on the amount of intake air. As the amount of intake air increases, the expansion and compression torques become larger and the pulsation in engine rpm also becomes larger. Therefore, for example, when the amount of intake air detected by the airflow sensor 23 is larger than a predetermined standard amount of intake air, $Nr_1$, $Nr_2$, $Nr_3$, and $Nr_4$ are set so that a width of each of the dead zones becomes larger than that determined for the standard amount of intake air as shown in (a) of FIG. 9. When the amount of intake air is smaller than the standard amount of intake air, $Nr_1$, $Nr_2$, $Nr_3$, and $Nr_4$ are set so that a width of each of the dead zones becomes smaller than that determined for the standard amount of intake air as shown in (b) of FIG. 9.

In the aforementioned manner, even when the amount of intake air changes at the time of idle stop, the width of each of the dead zones can be changed in accordance with the magnitude of the pulsation in engine rpm. As a result, the meshing engagement of the pinion gear 14 and the ring gear 11 can be achieved more smoothly.

The intake-air amount detection means is not necessarily required to be the airflow sensor 23 in the second embodiment described above. The same effects are obtained even by using a throttle-valve opening degree.

The invention claimed is:

1. An engine starting device for an automatic idle-stop system for performing an idle stop when an idle-stop condition is satisfied and restarting an engine when a restart condition is thereafter satisfied, the engine starting device comprising:
   a ring gear connected to a crankshaft of the engine;
   a starter motor for starting the engine;
   a pinion gear for transmitting rotation of said starter motor to said ring gear;
   pinion-gear moving means for moving said pinion gear so as to achieve meshing engagement with said ring gear; and
   starter control means for executing any one of a plurality of control modes for restarting the engine when the restart condition is satisfied,
   wherein said starter control means sets a dead zone in which the control modes are not executed for a time period when the engine is rotating only in a single direction throughout the dead zone, and engine-rpm is within a predetermined range entirely greater than zero rpm in said single direction throughout the dead zone,
   wherein at least one of the plurality of control modes is a control mode for restarting fuel supply to the engine so as to restart the engine only by a combustion of a fuel when the engine rpm is equal to or larger than a first predetermined rpm, and wherein the predetermined rpm range of the dead zone is a range between the first predetermined rpm and an rpm lower than the first predetermined rpm by an amount substantially equal to an rpm pulsation due to a torque fluctuation during each rotation of the engine.

2. The engine starting device according to claim 1, further comprising a pinion-gear rpm detector for detecting an rpm of said pinion gear,
wherein at least one of the plurality of control modes is a control mode for energizing said starter motor to rotate said pinion gear and then bringing said ring gear and said pinion gear into meshing engagement with each other by said pinion-gear moving means to restart the engine by cranking when the engine rpm is equal to or smaller than a second predetermined rpm and equal to or larger than a third predetermined rpm.

3. The engine starting device according to claim 1, wherein at least one of the plurality of control modes is a control mode for starting push-out of the pinion gear by said pinion-gear moving means and then rotating said starter motor to restart the engine.

4. The engine starting device according to claim 1, further comprising a crank-angle sensor for detecting a crank angle of the engine during execution of said starter control means,
wherein the engine rpm which determines a range of the dead zone is changed in accordance with the crank angle.

5. The engine starting device according to claim 2, further comprising a crank-angle sensor for detecting a crank angle of the engine during execution of said starter control means,
wherein the engine rpm which determines a range of the dead zone is changed in accordance with the crank angle.

6. The engine starting device according to claim 3, further comprising a crank-angle sensor for detecting a crank angle of the engine during execution of said starter control means,
wherein the engine rpm which determines a range of the dead zone is changed in accordance with the crank angle.

7. The engine starting device according to claim 4, wherein an engine rpm serving as an upper limit of a predetermined range corresponding to the dead zone is set high when the crank angle is a crank angle at which any one of cylinders of the engine is in a second half of a compression stroke or an engine rpm serving as a lower limit of the predetermined range corresponding to the dead zone is set low when the crank angle is a crank angle at which any one of the cylinders of the engine is in a first half of an expansion stroke.

8. The engine starting device according to claim 5, wherein an engine rpm serving as an upper limit of a predetermined range corresponding to the dead zone is set high when the crank angle is a crank angle at which any one of cylinders of the engine is in a second half of a compression stroke or an engine rpm serving as a lower limit of the predetermined range corresponding to the dead zone is set low when the crank angle is a crank angle at which any one of the cylinders of the engine is in a first half of an expansion stroke.

9. The engine starting device according to claim 6, wherein an engine rpm serving as an upper limit of a predetermined range corresponding to the dead zone is set high when the crank angle is a crank angle at which any one of cylinders of the engine is in a second half of a compression stroke or an engine rpm serving as a lower limit of the predetermined range corresponding to the dead zone is set low when the crank angle is a crank angle at which any one of the cylinders of the engine is in a first half of an expansion stroke.

10. The engine starting device according to claim 7, further comprising an intake-air amount detector for detecting an air amount sucked into the engine,
wherein the engine rpm which determines the range of the dead zone is changed depending on an amount of intake air detected by said intake-air amount detector.

11. The engine starting device according to claim 8, further comprising an intake-air amount detector for detecting an air amount sucked into the engine,
wherein the engine rpm which determines the range of the dead zone is changed depending on an amount of intake air detected by said intake-air amount detector.

12. The engine starting device according to claim 9, further comprising an intake-air amount detector for detecting an air amount sucked into the engine,
wherein the engine rpm which determines the range of the dead zone is changed depending on an amount of intake air detected by said intake-air amount detector.

\* \* \* \* \*